(12) United States Patent
Sood et al.

(10) Patent No.: US 10,743,245 B2
(45) Date of Patent: Aug. 11, 2020

(54) ENVIRONMENT AWARE ADAPTIVE BACKOFF FOR WIRELESS DEVICES THAT ARE SEARCHING FOR AVAILABLE NETWORKS

(71) Applicant: Microsoft Technology Licensing, LLC, Redmond, WA (US)

(72) Inventors: Mudit Sood, Bothell, WA (US); Srinivasa L. Rao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 16/042,497

(22) Filed: Jul. 23, 2018

(65) Prior Publication Data
US 2020/0029271 A1    Jan. 23, 2020

(51) Int. Cl.
*H04W 48/16* (2009.01)
*H04B 17/318* (2015.01)
*H04W 88/02* (2009.01)

(52) U.S. Cl.
CPC .......... *H04W 48/16* (2013.01); *H04B 17/318* (2015.01); *H04W 88/02* (2013.01)

(58) Field of Classification Search
CPC ..... H04W 48/16; H04W 88/02; H04B 17/318
See application file for complete search history.

(56) References Cited

U.S. PATENT DOCUMENTS

| | | | |
|---|---|---|---|
| 5,905,945 A * | 5/1999 | Hill | H04L 1/08 340/7.22 |
| 6,292,660 B1 | 9/2001 | Hartless et al. | |
| 6,807,163 B1 | 10/2004 | Shi | |
| 7,123,916 B2 | 10/2006 | Hunzinger | |
| 7,408,506 B2 | 8/2008 | Miller | |
| 7,616,604 B2 * | 11/2009 | Abdelhamid | H04W 8/005 370/329 |
| 8,165,092 B2 | 4/2012 | Gandham et al. | |
| 8,396,041 B2 | 3/2013 | Hassan | |
| 8,630,643 B2 | 1/2014 | Weng et al. | |
| 9,560,486 B2 * | 1/2017 | Li | H04W 64/006 |
| 2002/0060998 A1 | 5/2002 | Hunzinger | |
| 2002/0187780 A1 | 12/2002 | Souissi | |
| 2004/0137908 A1 * | 7/2004 | Sinivaara | H04B 7/022 455/452.1 |
| 2009/0068970 A1 | 3/2009 | Ahmed et al. | |
| 2011/0038357 A1 * | 2/2011 | Gong | H04W 48/16 370/338 |

(Continued)

OTHER PUBLICATIONS

"International Search Report and Written Opinion Issued in PCT Application No. PCT/US19/037831", dated Aug. 21, 2019, 11 Pages.

*Primary Examiner* — Curtis A Alia
(74) *Attorney, Agent, or Firm* — Ray Quinney & Nebeker; Thomas M. Hardman; Brianna L. Hinojosa

(57) ABSTRACT

A wireless device may perform a plurality of scans to search for an available wireless network. The wireless device may determine a first set of information about a first environment in which the wireless device is located at a first time. The wireless device may also determine a second set of information about a second environment in which the wireless device is located at a second time. The wireless device may perform a comparison of the first set of information and the second set of information and adjust a time period between successive scans based on the comparison.

20 Claims, 8 Drawing Sheets

(56) References Cited

U.S. PATENT DOCUMENTS

| | | |
|---|---|---|
| 2013/0210425 A1 | 8/2013 | Nagaraj |
| 2014/0341069 A1 | 11/2014 | Alon |
| 2015/0289198 A1 | 10/2015 | Boixadera et al. |

* cited by examiner

US 10,743,245 B2

ENVIRONMENT AWARE ADAPTIVE BACKOFF FOR WIRELESS DEVICES THAT ARE SEARCHING FOR AVAILABLE NETWORKS

CROSS-REFERENCE TO RELATED APPLICATIONS

N/A

BACKGROUND

A wireless network is a computer network that uses wireless data connections between network nodes. There are many different types of wireless networks in use today. Some examples include cellular networks and wireless local area networks (WLANs).

Cellular networks generally provide coverage over a wide geographic area. A typical cellular network includes a large number of overlapping geographic areas, or cells, each of which is served by one or more access points (which are often referred to as base stations). Wireless devices connect to a cellular network via a radio link to an access point. Access points are connected to a packet switched network, which enables data packets to be sent to and received from external networks such as the Internet. In some cellular networks, access points may be connected to a core network, which facilitates circuit-switched voice communications between wireless devices and with telephones in the wider public switched telephone network (PSTN). Alternatively, cellular networks may provide voice services via VoIP (Voice over Internet Protocol).

There are several different standards for cellular networks that are in widespread use today. For example, Long-Term Evolution (LTE) is a standard for high-speed wireless communication based on the Global System for Mobile (GSM) communication and Universal Mobile Telecommunications System (UMTS) technologies. LTE is sometimes referred to as a fourth generation (4G) standard. UMTS is a third generation (3G) mobile cellular system for networks based on the GSM communications standard, which was a second generation (2G) standard. CDMA2000 is a family of 3G mobile technology standards that is based on code division multiple access (CDMA) technology.

A WLAN is typically deployed within a relatively limited geographic area (e.g., a home, school, computer laboratory, office building). WLANs give users the ability to move around within a local coverage area and yet still be connected to the network. A typical WLAN includes one or more access points. An access point may be connected directly to a wired local area network (LAN) and may provide wireless connections for other devices to use that wired connection. An access point typically supports the connection of multiple wireless devices through its single wired connection. Most WLANs in use today are based on the Institute of Electrical and Electronics Engineers (IEEE) 802.11 standards, and they are commonly referred to as WiFi® networks.

SUMMARY

In accordance with an aspect of the present disclosure, a wireless device is disclosed that includes a wireless radio, a processor, memory in electronic communication with the processor, and instructions stored in the memory. The instructions may be executable by the processor to cause the wireless radio to perform a plurality of scans to search for an available wireless network, determine a first set of information about a first environment in which the wireless device is located at a first time, determine a second set of information about a second environment in which the wireless device is located at a second time, perform a comparison of the first set of information and the second set of information, and adjust a time period between successive scans based on the comparison.

The first set of information and the second set of information may both include at least one signal strength measurement for at least one frequency. Adjusting the time period between the successive scans may include decreasing the time period between the successive scans if the comparison indicates that a signal strength measurement associated with a frequency has increased by a threshold value. Adjusting the time period between the successive scans may include increasing the time period between the successive scans if the comparison indicates that the signal strength measurement associated with the frequency has decreased by the threshold value.

The instructions may also be executable by the processor to maintain a monitored pool of frequencies. The first set of information may include the monitored pool of frequencies updated at the first time. The second set of information may include the monitored pool of frequencies updated at the second time.

The instructions may also be executable by the processor to add a frequency to the monitored pool if the comparison indicates that a signal strength measurement associated with the frequency has increased above a threshold value and remove the frequency from the monitored pool if the comparison indicates that the signal strength measurement associated with the frequency has decreased below the threshold value by more than a buffer.

The wireless device may be connected to a roaming network when the plurality of scans are performed. The plurality of scans may be performed to search for a home network.

The first set of information and the second set of information may both include at least one signal strength measurement for at least one network. Adjusting the time period between the successive scans may include decreasing the time period between the successive scans if the comparison indicates that a signal strength measurement associated with a network has increased by a threshold value. Adjusting the time period between the successive scans may include increasing the time period between the successive scans if the comparison indicates that the signal strength measurement associated with the network has decreased by the threshold value.

The instructions may also be executable by the processor to maintain a monitored pool of networks. The first set of information may include the monitored pool of networks updated at the first time. The second set of information may include the monitored pool of networks updated at the second time.

The instructions may also be executable by the processor to add a network to the monitored pool if the comparison indicates that a signal strength measurement associated with the network has increased above a threshold value and remove the network from the monitored pool if the comparison indicates that the signal strength measurement associated with the network has decreased below the threshold value by more than a buffer.

The first set of information and the second set of information may include at least one of signal strength measurements for wireless signals corresponding to a plurality of different frequencies, identifiers received from other wireless devices, motion information provided by a motion sensor, images provided by a camera, or audio information provided by a microphone.

In accordance with another aspect of the present disclosure, a method for adaptive backoff is disclosed. The method may be implemented by a wireless device. The method may include performing a plurality of scans to search for an available wireless network, determining a first set of information about a first environment in which the wireless device is located at a first time, determining a second set of information about a second environment in which the wireless device is located at a second time, performing a comparison of the first set of information and the second set of information, and adjusting a time period between successive scans based on the comparison.

The first set of information and the second set of information may both include at least one signal strength measurement for at least one frequency. Adjusting the time period between the successive scans may include decreasing the time period between the successive scans if the comparison indicates that a signal strength measurement associated with a frequency has increased by a threshold value. Adjusting the time period between the successive scans may include increasing the time period between the successive scans if the comparison indicates that the signal strength measurement associated with the frequency has decreased by the threshold value.

The method may further include maintaining a monitored pool of frequencies. The first set of information may include the monitored pool of frequencies updated at the first time, and the second set of information may include the monitored pool of frequencies updated at the second time.

The method may further include adding a frequency to the monitored pool if the comparison indicates that a signal strength measurement associated with the frequency has increased above a threshold value and removing the frequency from the monitored pool if the comparison indicates that the signal strength measurement associated with the frequency has decreased below the threshold value by more than a buffer.

The wireless device may be connected to a roaming network when the plurality of scans are performed. The plurality of scans are performed to search for a home network.

The first set of information and the second set of information may both include at least one signal strength measurement for at least one network. Adjusting the time period between the successive scans may include decreasing the time period between the successive scans if the comparison indicates that a signal strength measurement associated with a network has increased by a threshold value. Adjusting the time period between the successive scans may include increasing the time period between the successive scans if the comparison indicates that the signal strength measurement associated with the network has decreased by the threshold value.

The method may further include maintaining a monitored pool of networks. The first set of information may include the monitored pool of networks updated at the first time. The second set of information may include the monitored pool of networks updated at the second time.

The method may further include adding a network to the monitored pool if the comparison indicates that a signal strength measurement associated with the network has increased above a threshold value and removing the network from the monitored pool if the comparison indicates that the signal strength measurement associated with the network has decreased below the threshold value by more than a buffer.

The first set of information and the second set of information may include at least one of signal strength measurements for wireless signals corresponding to a plurality of different frequencies, identifiers received from other wireless devices, motion information provided by a motion sensor, images provided by a camera, or audio information provided by a microphone.

In accordance with another aspect of the present disclosure, a wireless device is disclosed that includes a wireless radio, a processor, memory in electronic communication with the processor, and instructions stored in the memory. The instructions may be executable by the processor to cause the wireless radio to perform a plurality of scans to search for an available wireless network to which the wireless device is not already connected; determine information about an environment in which the wireless device is located during a time interval; and make an inference, based on the information, about whether the wireless device has moved during the time interval; and adjust a time period between successive scans based on the inference.

Adjusting the time period between the successive scans may include decreasing the time period between the successive scans if the inference is that the wireless device has moved during the time interval. Adjusting the time period between the successive scans may include increasing the time period between the successive scans if the inference is that the wireless device has not moved during the time interval.

DETAILED DESCRIPTION

Figure 1:
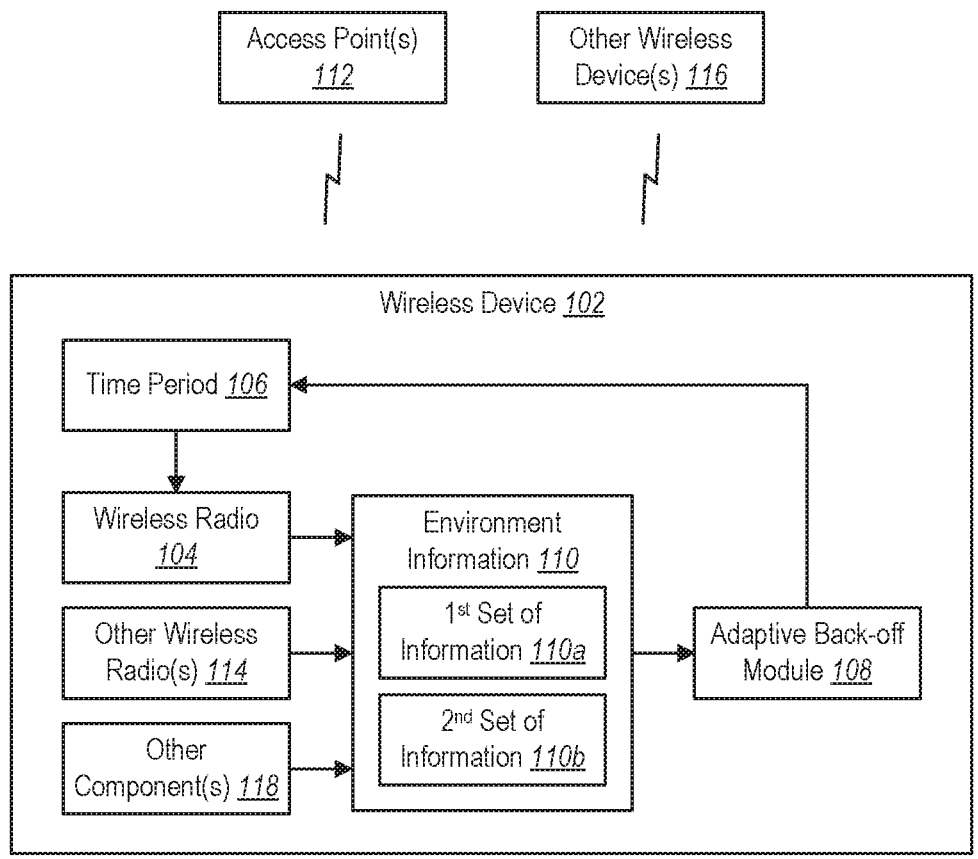
FIG. 1 illustrates an example of a system that is configured to implement adaptive backoff in accordance with the present disclosure.

A wireless network may include one or more access points that enable wireless devices to connect to the network. The techniques disclosed herein are applicable to many different types of wireless networks, including (but not limited to) cellular networks and WLANs. Thus, the term "access point" (or "AP"), as used herein, should be interpreted broadly to encompass any networking hardware device that allows one or more wireless devices to connect to a network via wireless communications, including APs utilized in cellular networks and APs utilized in WLANs.

Many different types of wireless devices may be capable of connecting to a wireless network and communicating with one or more other devices via the wireless network. Some examples of such wireless devices include cellular telephones, smartphones, tablet computers, laptop computers, sensors, and navigation systems.

There are many scenarios in which a wireless device periodically scans for an available wireless network. For example, this may occur when a wireless device is initially powered on or after the wireless device has moved outside of the coverage area of a wireless network. As another example, in the context of cellular networks, a wireless device may periodically scan for a home network when the wireless device is connected to a roaming network. In this context, the term "home network" may refer to a network with which the wireless device has some type of subscription (typically a paid subscription). The term "roaming network" may refer to any network that the wireless device uses other than the home network.

There is often a tradeoff between providing the user of the wireless device with a good experience (by, for example, quickly connecting the wireless device to a network) and conserving battery power. If a wireless device frequently scans for an available network, this increases the likelihood that the wireless device will be able to quickly locate and connect to a network. On the other hand, frequent scanning uses a significant amount of battery power.

With known approaches, this tradeoff is often balanced in the following way. There may be an initial time interval during which scanning is relatively aggressive and the time period between successive scans is fixed. Then, after this initial time interval of aggressive scanning, the amount of time between successive scans may be increased. Increasing the amount of time between successive scans is sometimes referred to as "backoff." A time interval during which backoff is performed may be referred to as a backoff interval.

Known approaches suffer from various drawbacks because they do not take movement of the wireless device into consideration when determining what the time period between successive scans should be. When a wireless device stays in the same location, the likelihood that the wireless device will be able to connect to a network typically does not change. Known approaches, however, do not account for this. As a result, a wireless device may be configured so that the time period between successive scans stays the same even when the wireless device is not moving, even though this may cause unnecessary scanning to occur and needlessly waste battery power. On the other hand, a wireless device may be configured to perform backoff even when the wireless device is moving to a new location, even though this may cause the wireless device to take longer than necessary to connect to a network.

The present disclosure provides adaptive backoff techniques that take movement of the wireless device into consideration when determining what the time period between successive scans should be. An adaptive backoff mechanism in accordance with the present disclosure may determine information about the environment in which the wireless device is located. By comparing information about the environment in which the wireless device is currently located with similar information from a previous point in time, an inference may be made about whether the wireless device has moved. The time period between successive scans may be adjusted accordingly. For example, the time period between successive scans may be decreased if the wireless device has moved to a new location. In other words, scanning may be performed more frequently when it is more likely that the wireless device will be able to acquire service, thereby improving the user's experience by increasing the likelihood that the wireless device will be able to quickly connect to a network. On the other hand, if the wireless device has stayed in the same location, the time period between successive scans may be increased. In this way, unnecessary scanning may be avoided, thereby saving battery power.

FIG. 1 illustrates an example of a system 100 for adaptive backoff in accordance with the present disclosure. The system 100 includes a wireless device 102, which includes a wireless radio 104. The wireless radio 104 may take the form of a cellular radio that is configured to communicate with a cellular network, a WLAN radio that is configured to communicate with a WLAN, or another type of wireless radio that is configured to communicate with another type of wireless network.

Under certain circumstances, the wireless radio 104 may be configured to periodically scan for an available wireless network. For example, the wireless radio 104 may scan for an available wireless network when the wireless device 102 is initially powered on or after the wireless device 102 has moved outside of the coverage area of a wireless network. As another example, if the wireless radio 104 is a cellular radio, the wireless radio 104 may periodically scan for a home network when the wireless device 102 is connected to a roaming network.

In this context, the term "scan" may refer to a passive scan, an active scan, or some combination thereof. With a passive scan, a wireless device 102 may passively receive or attempt to receive wireless signals without transmitting its own wireless signals. With an active scan, a wireless device 102 may actively transmit its own wireless signals in an attempt to initiate transmission of wireless signals from other wireless devices. Scanning, whether active or passive, may be performed across a plurality of different frequencies.

Information about the time period 106 between successive scans may be stored on the wireless device 102. The wireless device 102 may include an adaptive backoff module 108 that is configured to modify the time period 106 based on information 110 about the environment in which the wireless device 102 is located. Thus, the adaptive backoff module 108 may be environment aware, or in other words, aware of the environment in which the wireless device 102 is located. The adaptive backoff module 108 may also be self-learning, because the adaptive backoff module 108 may detect changes to the environment in which the wireless device 102 is located and adjust the time period 106 based on those changes.

The environment information 110 may include a first set of information 110a about the environment in which the wireless device 102 is located at a first time ($t_1$). The environment information 110 may also include a second set of information 110b about the environment in which the wireless device 102 is located at a second time ($t_2$).

The environment information 110 may be based at least in part on information provided by the wireless radio 104. For example, the wireless radio 104 may detect signals from one or more access points 112. If the wireless radio 104 is a cellular radio, the access point(s) 112 may be cellular access points. Alternatively, if the wireless radio 104 is a WLAN radio, the access point(s) 112 may be WLAN access points.

Information derived from the signals that are detected by the wireless radio 104 may be at least part of the environment information 110 that is used to modify the time period 106 between successive scans.

In addition to the wireless radio 104 discussed previously, the wireless device 102 may include one or more other wireless radio(s) 114. If the wireless radio 104 is a cellular radio, the other wireless radio(s) 114 may include a WLAN radio. Conversely, if the wireless radio 104 is a WLAN radio, the other wireless radio(s) 114 may include a cellular radio. The other wireless radio(s) 114 may also include one or more short-range wireless radios (e.g., Bluetooth®, near-field communication), a global positioning system (GPS) radio, etc.

The environment information 110 may also be based at least in part on information provided by the other wireless radio(s) 114. For example, the other wireless radio(s) 114 may detect signals from one or more other wireless device(s) 116. The other wireless device(s) 116 may include cellular access points, WLAN access points, short-range radios, GPS satellites, etc. Information derived from the signals that are detected by the other wireless radio(s) 114 may be at least part of the environment information 110 that is used to modify the time period 106 between successive scans.

The environment information 110 may also be based at least in part on information provided by other component(s) 118 of the wireless device 102. For example, images captured by a camera and audio captured by a microphone may also be included as part of the environment information 110.

Figure 2:
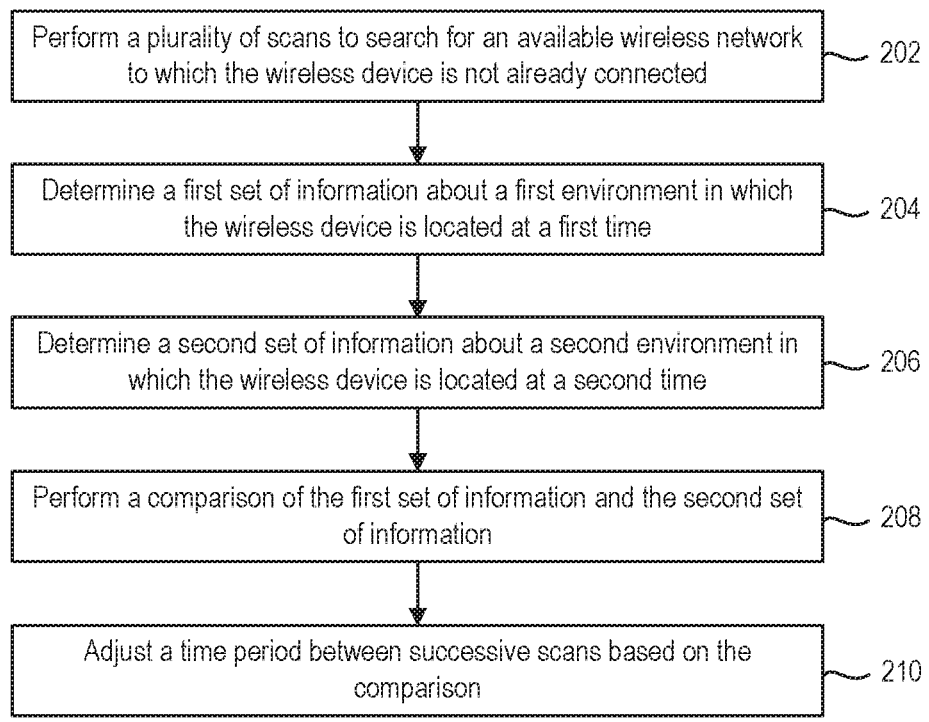
FIG. 2 illustrates an example of a method for adaptive backoff that may be implemented by the system shown in FIG. 1.

FIG. 2 illustrates an example of a method 200 for adaptive backoff in accordance with the present disclosure. The method 200 will be discussed in relation to the system 100 shown in FIG. 1.

The wireless device 102 may perform 202 a plurality of scans to search for an available wireless network to which the wireless device 102 is not already connected. For example, this may occur when the wireless device 102 is initially powered on or after the wireless device 102 has moved outside of the coverage area of a wireless network. As another example, if the wireless device 102 is connected to a cellular network, the wireless device 102 may periodically scan for a home network when the wireless device 102 is connected to a roaming network.

At some point, the wireless device 102 may determine 204 a first set of information 110a about the environment in which the wireless device 102 is located. Subsequently, the wireless device 102 may determine 206 a second set of information 110b about the environment in which the wireless device 102 is located. The wireless device 102 may determine 204 the first set of information 110a at a first time ($t_1$) and may determine 206 the second set of information 110b at a second time ($t_2$), where $t_2$ occurs after $t_1$. There may be many different sources of information that contribute to the first set of information 110a and the second set of information 110b, including the wireless radio 104 (which may detect signals from one or more access points 112), one or more other wireless radios 114 (which may receive information from one or more other wireless devices 116), and one or more other components 118 of the wireless device 102.

The wireless device 102 may perform 208 a comparison of the first set of information 110a and the second set of information 110b. By making this comparison, it may be possible to infer whether the wireless device 102 has substantially changed its location between time $t_1$ (when the first set of information 110a was determined) and time $t_2$ (when the second set of information 110b was determined). The wireless device 102 may adjust 210 the time period 106 between successive scans based on the comparison of the first set of information 110a and the second set of information 110b and any relevant inferences resulting therefrom.

For example, if the second set of information 110b is substantially different from the first set of information 110a, then it may be inferred that the wireless device 102 has substantially changed its location between time $t_1$ and time $t_2$. Consequently, the time period 106 between successive scans may be decreased so that scanning occurs more frequently. Conversely, if the second set of information 110b is substantially similar to the first set of information 110a, then it may be inferred that the wireless device 102 has not substantially changed its location between time $t_1$ and time $t_2$. Consequently, the time period 106 between successive scans may be increased so that scanning occurs less frequently.

Figure 3:
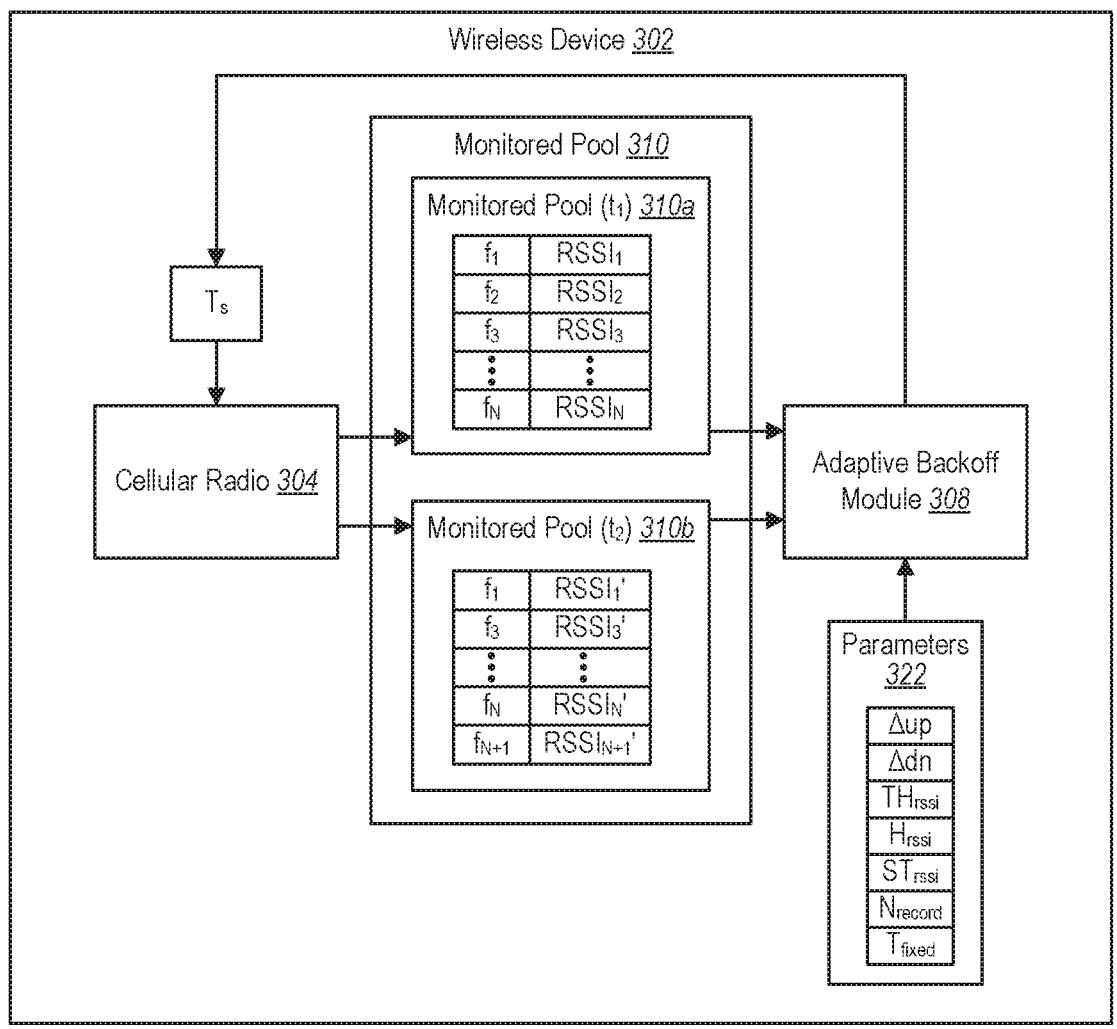
FIG. 3 illustrates an example of a system in which a wireless device uses a monitored pool of frequencies to implement adaptive backoff.

FIG. 3 illustrates another example of a system 300 for adaptive backoff in accordance with the present disclosure. This system 300 is similar in some respects to the system 100 shown in FIG. 1. The following discussion will focus on features that are included in the system 300 of FIG. 3 that are not included in the system 100 of FIG. 1, and/or on differences between the two systems 100, 300.

In this system 300, the wireless device 302 includes a cellular radio 304 that is configured to communicate with access points 312a-n in one or more cellular networks. In the context of wireless communication via cellular networks, the wireless device 302 may be referred to as a user equipment, a mobile station, a subscriber station, a mobile terminal, or the like.

Under certain circumstances, the cellular radio 304 may be configured to periodically scan for an available cellular network. For example, this may occur when the wireless device 302 is initially powered on or after the wireless device 302 has moved outside of the coverage area of a cellular network.

The LTE standard specifies a cell search procedure, which is part of the process of cell selection. The techniques disclosed herein may be utilized to adjust the time period between successive instances of the cell search procedure during cell selection. However, the scope of the present disclosure is applicable to many other types of wireless systems as well and should not be limited to systems that implement the LTE standard.

The time period between successive scans is represented as $T_s$ in FIG. 3. As before, the wireless device 302 may include an adaptive backoff module 308 that is configured to modify $T_s$ based on information about the environment in which the wireless device 302 is located. In the depicted system 300, this information includes a monitored pool 310 of frequencies.

When the wireless device 302 performs a scan, the wireless device 302 may receive signals from one or more access points 312a-n. The access points 312a-n may belong to the same cellular network, or to different cellular networks.

The access points 312a-n may transmit at different frequencies, and scanning may be performed across a plurality of different frequencies. For example, suppose that a first access point 312a transmits at a first frequency ($f_1$), a second access point 312b transmits at a second frequency ($f_2$), and an Nth access point 312n transmits at an Nth frequency ($f_N$). During a scan, the cellular radio 304 may initially be tuned to a first frequency ($f_1$) and receive wireless signals from the first access point 312a. Then, the wireless radio 104 may be tuned to a second frequency ($f_2$) and receive wireless signals from the second access point 312b. This process may continue with one or more additional frequencies. At some point, the wireless radio 104 may be tuned to an Nth frequency ($f_N$) and receive wireless signals from the Nth access point 312n.

The monitored pool 310 of frequencies may include certain information, such as a received signal strength indication (RSSI), corresponding to the frequencies at which the wireless radio 104 received signals during a scan. If, for example, the wireless device 302 performs a scan and receives signals at N different frequencies ($f_1, f_2, \ldots, f_N$), then the monitored pool 310 of frequencies may include up to N RSSI values ($RSSI_1, RSSI_2, \ldots, RSSI_N$). As will be explained in greater detail below, the wireless device 302 may be configured so that only those frequencies that have an RSSI value above a threshold ($TH_{rssi}$) may be added to the monitored pool 310 of frequencies. Thus, even if the wireless device 302 receives signals at N different frequencies, the monitored pool 310 of frequencies may include fewer than N RSSI values if some of the received signals have an RSSI value that is below $TH_{rssi}$.

As before, the wireless device 302 may include a first set of information about the environment in which the wireless device 302 is located at a first time ($t_1$) and a second set of information about the environment in which the wireless device 302 is located at a second time ($t_2$). In the example shown in FIG. 3, the first set of information includes the monitored pool 310a updated at time $t_1$, and the second set of information includes the monitored pool 310b updated at time $t_2$. The monitored pool 310a at time $t_1$ includes N RSSI values ($RSSI_1, RSSI_2, \ldots, RSSI_N$) corresponding to N frequencies ($f_1, f_2, \ldots, f_N$). At time $t_2$, the frequency $f_2$ is removed from the monitored pool 310b because the corresponding RSSI value ($RSSI_2'$) has fallen below the relevant threshold ($TH_{rssi}$) by more than a buffer ($H_{rssi}$). A new frequency, $f_{N+1}$, is added to the monitored pool 310b because the corresponding RSSI value ($RSSI_{N+1}'$) is above $TH_{rssi}$.

In addition to $T_s$, the wireless device 302 may also include certain other parameters 322 that may affect how the monitored pool 310 is maintained. These parameters may include $\Delta up$, $\Delta dn$, $TH_{rssi}$, $H_{rssi}$, $ST_{rssi}$, $N_{record}$, and $T_{fixed}$.

The parameter $\Delta up$ may indicate an amount by which $T_s$ should be increased when certain conditions (which will be discussed below) are satisfied. In other words, the parameter $\Delta up$ may be a measure of the extent to which backoff should be performed. Conversely, the parameter $\Delta dn$ may indicate an amount by which $T_s$ should be decreased when certain conditions (which will also be discussed below) are satisfied. In other words, the parameter $\Delta dn$ may be a measure of the extent to which scanning should become more aggressive.

The parameter $TH_{rssi}$ may indicate a threshold value for measured RSSI. If a frequency that is not in the monitored pool 310 of frequencies has a measured RSSI that is greater than or equal to $TH_{rssi}$, then that frequency may be added to the monitored pool 310 of frequencies. On the other hand, if a frequency that is in the monitored pool 310 of frequencies has a measured RSSI that is below $TH_{rssi}$ by more than a buffer, then that frequency may be removed from the monitored pool 310 of frequencies. The buffer may be represented by the parameter $H_{rssi}$.

The parameter $ST_{rssi}$ may indicate the amount by which the RSSI of a monitored frequency should increase or decrease in order to affect $T_s$ by $\Delta dn$ or $\Delta up$, respectively. In other words, if the RSSI of a monitored frequency increases by $ST_{rssi}$, then $T_s$ may be decreased by $\Delta dn$. Conversely, if the RSSI of a monitored frequency decreases by $ST_{rssi}$, then $T_s$ may be increased by $\Delta up$.

The parameter $N_{record}$ may indicate the number of records in the monitored pool 310 of frequencies. The value of $N_{record}$ may be determined based on memory constraints of the wireless device 302. If a new frequency should be added when the monitored pool 310 is full, a first-in-first-out (FIFO) approach may be followed.

The parameter $T_{fixed}$ may indicate a time period when the wireless device 304 scans aggressively. If the wireless device 302 implements the LTE standard, $T_{fixed}$ may indicate a time period at the start of the cell selection procedure when the wireless device 304 scans aggressively. In other contexts, $T_{fixed}$ may indicate a time period of aggressive scanning that may be performed when the wireless device 302 begins searching for an available network (e.g., when the wireless device 302 is initially powered on or after the wireless device 302 has moved outside of the coverage area of a network). The value of $T_s$ may be fixed during the time period represented by $T_{fixed}$. In other words, the adaptive backoff module 308 may be configured so that it does not adjust the value of $T_s$ during this period of aggressive scanning.

Figure 4:
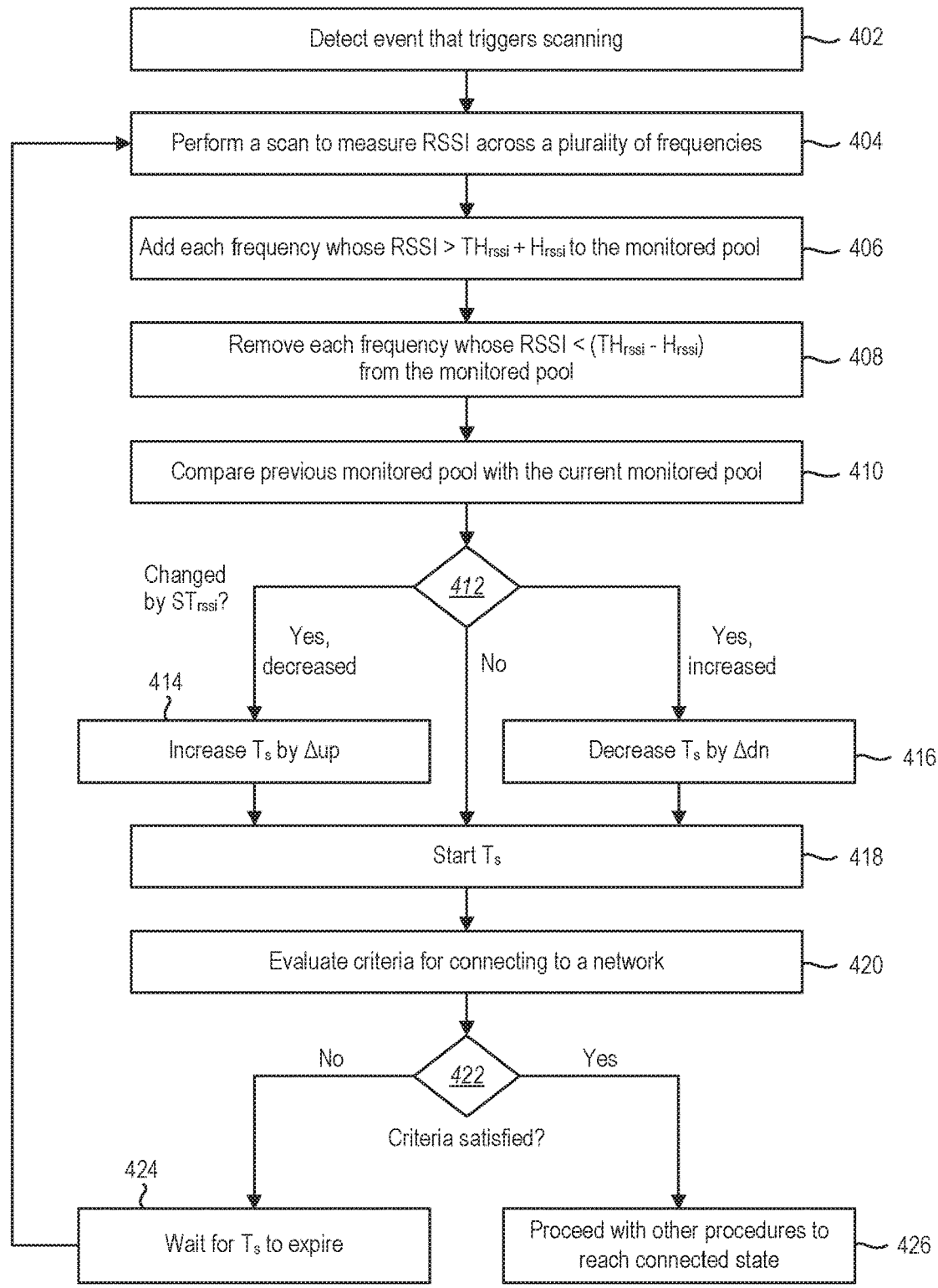
FIG. 4 illustrates an example of a method for adaptive backoff that may be implemented by the system shown in FIG. 3.

FIG. 4 illustrates another example of a method 400 for adaptive backoff in accordance with the present disclosure. The method 400 will be discussed in relation to the system 300 shown in FIG. 3.

As indicated above, the parameter $T_{fixed}$ may indicate a time period of aggressive scanning that may be performed when the wireless device 302 begins searching for an available network. The method 400 shown in FIG. 4 may be performed after this $T_{fixed}$ time period of aggressive scanning has finished.

At some point, the wireless device 302 may detect 402 an event that triggers scanning. Some examples of events that trigger scanning include the wireless device 302 being initially powered on, the wireless device 302 moving outside of the coverage area of a network, and expiration of a timer that has been set to $T_s$.

In response to detecting 402 an event that triggers scanning, the wireless device 302 may perform 404 a scan to measure RSSI across a plurality of frequencies. Each frequency whose RSSI is greater than or equal to a threshold value ($TH_{rssi}$) by more than a buffer ($H_{rssi}$) may be added 406 to the monitored pool 310 of frequencies. In addition, each frequency that was previously in the monitored pool 310 of frequencies but whose RSSI value has fallen below $TH_{rssi}$ by more than a buffer ($H_{rssi}$) may be removed 408 from the monitored pool 310 of frequencies.

Suppose that the monitored pool 310 of frequencies is updated in this manner (i.e., adding 406 and/or removing 408 frequencies, as appropriate) at time $t_2$. Further suppose that the monitored pool 310 of frequencies was previously updated at time $t_1$, following the previous scan that was performed by the wireless device 302. The monitored pool 310a updated at time $t_1$ may be compared 410 with the monitored pool 310b updated at time $t_2$.

A determination may be made 412 about whether any of the RSSI values for any of the frequencies in the monitored pool 310 have changed by at least $ST_{rssi}$. If any of the RSSI values have decreased by at least $ST_{rssi}$, then $T_s$ may be increased 414 by $\Delta up$. Conversely, if any of the RSSI values have increased by at least $ST_{rssi}$, then $T_s$ may be decreased 416 by $\Delta dn$. A timer having the value of $T_s$ may then be started 418.

The operations performed up to this point in the method 400 do not require any decoding of data. In other words, maintaining the monitored pool 310 of frequencies may involve measuring the energy of various signals (e.g., determining RSSI values) without determining anything about the information that is contained in those signals. For the remaining operations in the method 400, the wireless device 302 may decode at least some of the information contained in the signals. This information may be used to evaluate 420 certain criteria for connecting to a network and to determine 422 whether the relevant criteria are satisfied. The criteria may include whether any of the frequencies in the monitored pool 310 have an RSSI value above a maximum threshold (different from $TH_{rssi}$, which is a minimum threshold for entering the monitored pool 310). In the context of an LTE system, the relevant criteria may be referred to as cell selection criteria. As noted previously, however, the scope of the present disclosure is applicable to many other types of wireless systems as well and should not be limited to systems that implement the LTE standard.

If the wireless device 302 evaluates 420 the criteria and determines 422 that the criteria are not satisfied, the wireless device 302 may simply wait 424 for the $T_s$ timer to expire, at which point the method 400 may return to the operation of performing 404 another scan. The method 400 may then continue as described above. If the monitored pool 310 remains unchanged for a certain number of expirations of the $T_s$ timer, then $T_s$ may be increased.

If, however, the wireless device 302 determines 422 that the criteria are satisfied, the wireless device 302 may proceed 426 with other procedures to reach a connected state (i.e., a state in which the wireless device 302 is connected to a network). At this point the monitored pool 310 may be emptied in order to keep the information fresh when the wireless device 302 enters a state where it begins scanning again.

In the method 400 shown in FIG. 4, the adaptive backoff module 308 makes an inference about whether the wireless device 302 has moved during a particular time interval (e.g., the time interval from time $t_1$ to time $t_2$) based on the information about the environment in which the wireless device 302 is located during the time interval (e.g., the information in the monitored pool 310). The adaptive backoff module 308 may also adjust $T_s$ based on this inference.

If, for example, frequencies are added to or removed from the monitored pool 310 during the time interval, the adaptive backoff module 308 may infer that the wireless device 302 has moved during the time interval. The wireless device 302 may then decrease $T_s$ so that scanning occurs more frequently.

If, on the other hand, the monitored pool 310 does not change during the time interval, the adaptive backoff module 308 may infer that the wireless device 302 has not moved during the time interval. The wireless device 302 may then increase $T_s$ so that scanning occurs less frequently.

Figure 5:
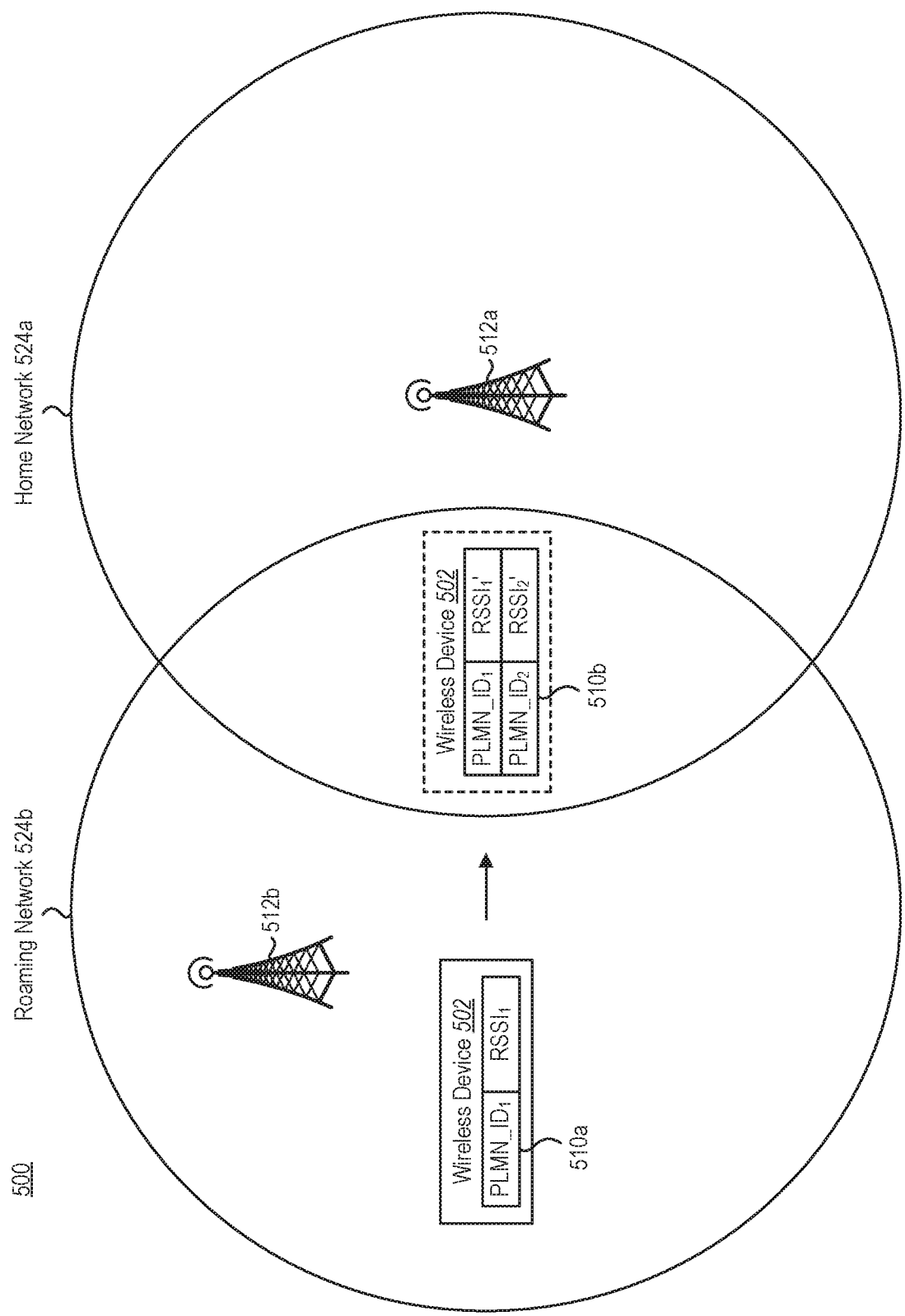
FIG. 5 illustrates an example of a system in which a wireless device implements adaptive backoff in the context of searching for a home network while connected to a roaming network.

FIG. 5 illustrates another example of a system 500 for adaptive backoff in accordance with the present disclosure. This system 500 is similar in some respects to the system 100 shown in FIG. 1. The following discussion will focus on features that are included in the system 500 of FIG. 5 that are not included in the system 100 of FIG. 1, and/or on differences between the two systems 100, 500.

The wireless device 502 may include a cellular radio (not shown), which may be configured to communicate with access points 512*a-b* in one or more cellular networks 524*a-b*. If the wireless device 502 is located outside of the coverage area of its home network 524*a* but is located within the coverage area of a roaming network 524*b*, the wireless device 502 may connect to the roaming network 524*b*. When the wireless device 502 is connected to the roaming network 524*b*, the wireless device 502 may periodically scan for the home network 524*a*. The wireless device 502 may utilize the adaptive backoff techniques disclosed herein to determine what the time period between successive scans should be.

As before, the wireless device 502 may maintain a monitored pool. In the depicted example, however, the wireless device 502 may maintain a monitored pool of networks instead of a monitored pool of frequencies. Thus, the wireless device 502 may decode the signals received from access points 512*a-b* such that the wireless device 502 is able to identify the networks to which the access points 512*a-b* belong.

FIG. 5 shows the wireless device 502 at a first point in time ($t_1$), when the wireless device 502 is located within the coverage area of the roaming network 524*b* and receives signals from an access point 512*b* of the roaming network 524*b*. In the depicted example, the monitored pool 510*a* at time $t_1$ includes an RSSI value for the roaming network 524*b*. However, at time $t_1$ the wireless device 502 is unable to receive a signal from an access point 512*a* of the home network 524*a*.

FIG. 5 also shows the wireless device 502 at a second point in time ($t_2$), after the wireless device 502 has moved in the direction of the home network 524*a*. At time $t_2$, the wireless device 502 is located within the coverage area of the roaming network 524*b* and also within the coverage area of the home network 524*a*. Thus, the monitored pool 510*b* at time $t_2$ includes an RSSI value for the home network 524*a* in addition to an RSSI value for the roaming network 524*b*.

Within the monitored pools 510*a-b*, the RSSI values may each be associated with a network identifier, such as a public land mobile network (PLMN) identifier. In the depicted example, the roaming network 524*b* is associated with $PLMN\_ID_1$ and the home network 524*a* is associated with $PLMN\_ID_2$.

The wireless device 502 may include various parameters that may affect how the monitored pool is maintained. These parameters may be similar to the parameters 322 that were discussed above in connection with the wireless device 302 shown in FIG. 3. In the context of a wireless device 502 that is located within the coverage area of a roaming network 524*b* and periodically scans for a home network 524*a*, the time period between successive scans may be referred to herein as $T_{hns}$ (where "hns" stands for home network search).

Figure 6:
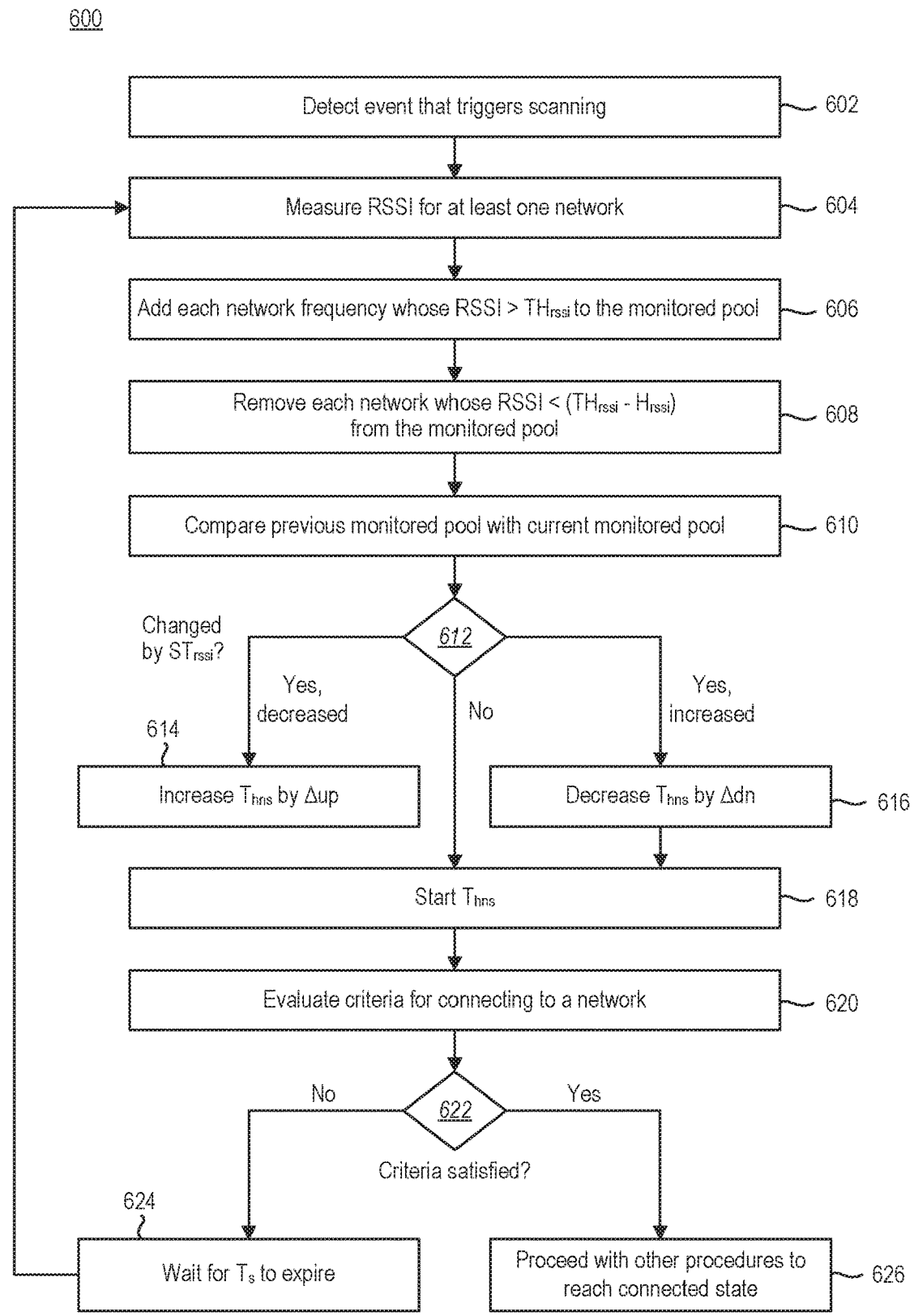
FIG. 6 illustrates an example of a method for adaptive backoff that may be implemented by the system shown in FIG. 5.

FIG. 6 illustrates another example of a method 600 for adaptive backoff in accordance with the present disclosure. The method 600 will be discussed in relation to the system 500 shown in FIG. 5.

In response to detecting 602 an event that triggers scanning (such as expiration of a timer that has been set to $T_{hns}$), the wireless device 502 may perform 604 a scan to measure RSSI for at least one network. Each network whose RSSI is greater than or equal to a threshold value ($TH_{rssi}$) may be added 606 to the monitored pool of networks. In addition, each network that was previously in the monitored pool of networks but whose RSSI value has fallen below $TH_{rssi}$ by more than a buffer ($H_{rssi}$) may be removed 608 from the monitored pool of networks.

Suppose that the monitored pool of networks is updated in this manner (i.e., adding 606 and/or removing 608 networks, as appropriate) at time $t_2$. Further suppose that the monitored pool of networks was previously updated at time $t_1$, following the previous scan that was performed by the wireless device 502. The monitored pool 510a updated at time $t_1$ may be compared 610 with the monitored pool 310b updated at time $t_2$.

A determination may be made 612 about whether any of the RSSI values for any of the networks in the monitored pool have changed by at least $ST_{rssi}$. If any of the RSSI values have decreased by at least $ST_{rssi}$, then $T_{hns}$ may be increased 614 by $\Delta$up. Conversely, if any of the RSSI values have increased by at least $ST_{rssi}$, then $T_{hns}$ may be decreased 616 by $\Delta$dn. A timer having the value of $T_{hns}$ may then be started 618.

The wireless device 502 may evaluate 620 certain criteria for connecting to the home network 524a. If the wireless device 502 determines 622 that the criteria are not satisfied, the wireless device 502 may simply wait 624 for the $T_{hns}$ timer to expire, at which point the method 600 may return to the operation of performing 604 another scan to measure RSSI for at least one network. If, however, the wireless device 502 determines 622 that the criteria are satisfied, the wireless device 502 may proceed 626 with other procedures to reach a connected state (i.e., a state in which the wireless device 502 is connected to the home network 524a).

Figure 7:
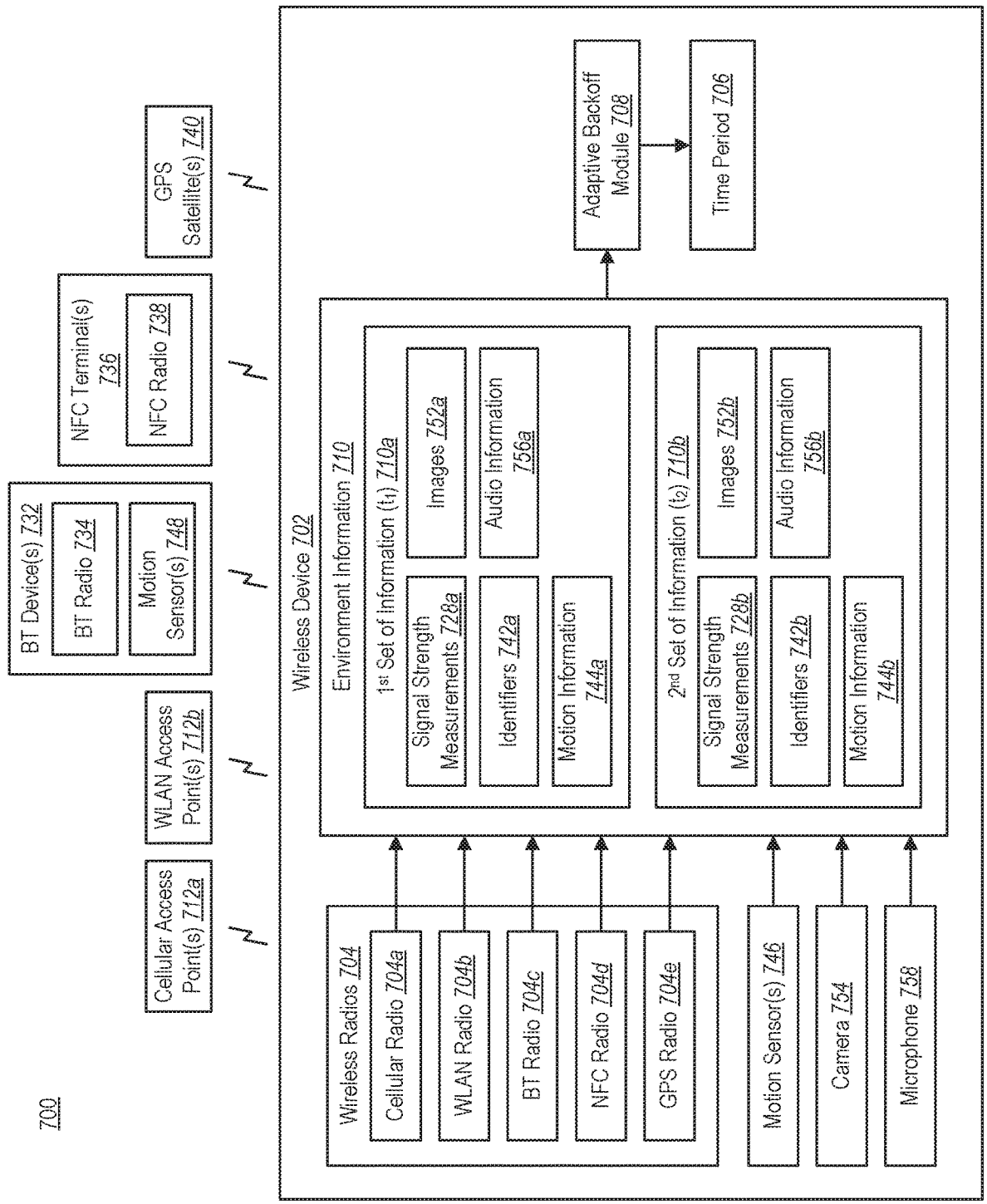
FIG. 7 illustrates an example of a system in which a wireless device uses many different types of information collected from many different types of information sources to implement adaptive backoff.

FIG. 7 illustrates another example of a system 700 for adaptive backoff in accordance with the present disclosure. This system 700 is similar in some respects to the system 100 shown in FIG. 1. The following discussion will focus on features that are included in the system 700 of FIG. 7 that are not included in the system 100 of FIG. 1, and/or on differences between the two systems 100, 700.

The system 700 includes a wireless device 702 that may include information 710 about the environment in which the wireless device 702 is located at different points in time. As before, the wireless device 702 may include a first set of information 710a about the environment in which the wireless device 702 is located at a first point in time ($t_1$) and a second set of information 710b about the environment in which the wireless device 702 is located at a second point in time ($t_2$).

In the depicted example, the environment information 710 may include many different types of information collected from many different types of information sources. For example, the environment information 710 may include signal strength measurements 728a-b from one or more wireless radios 704. The wireless device 702 may include multiple wireless radios 704, including a cellular radio 704a and/or a WLAN radio 704b, one or more short-range radios such as a Bluetooth® radio 704c and/or a near-field communication (NFC) radio 704d, and a global positioning system (GPS) radio 704e. The cellular radio 704a may receive wireless signals from one or more cellular access points 712a. The WLAN radio 704b may receive wireless signals from one or more WLAN access points 712b. The Bluetooth® radio 704c may receive wireless signals from one or more Bluetooth® devices 732, each of which may include a Bluetooth® radio 734. The NFC radio 704d may receive wireless signals from one or more NFC terminals 736 (e.g., NFC payment terminals), each of which may include an NFC radio 738. The NFC radio 738 may be included in an NFC tag that is part of the NFC terminal 736. The GPS radio 704e may receive wireless signals from one or more GPS satellites 740.

Signal strength measurements 728a-b may be performed on the wireless signals that are received by some or all of the various wireless radios 704 of the wireless device 702. These signal strength measurements 728a-b may form at least a part of the environment information 710 that the adaptive backoff module 708 uses to modify the time period 706 between successive scans.

The environment information 710 may also include other information in addition to signal strength measurements 728a-b. For example, the environment information 710 may also include identifiers 742a-b received from other wireless devices. Some examples of identifiers 742a-b that may be received include medium access control (MAC) addresses, network identifiers, and device identifiers. Comparing identifiers 742a-b received at different times may provide information that may be used to determine whether the wireless device 702 has moved. For example, if the wireless device 702 receives a signal that includes a particular identifier 742a at time $t_1$ but does not receive that signal at time t2, this may be an indication that the wireless device 702 has moved. In addition, the type of identifier 742a that is received can indicate the range of motion (how far the wireless device 702 has moved). For example, detecting a change in a service set identifier (SSID) received from a WLAN access point 712b or detecting a change in a Bluetooth® address received from a Bluetooth® device 732 may indicate that the wireless device 702 has moved a relatively large distance (e.g., a few hundred feet). In contrast, detecting a change in an NFC tag (in other words, detecting that the wireless device 702 is receiving signals from a different NFC terminal 736) may indicate that the wireless device 702 has moved a relatively small distance (e.g., a few centimeters).

The environment information 710 may also include motion information 744a-b. The motion information 744a-b may be received from one or more motion sensors 746 that are part of the wireless device 702 and/or from one or more motion sensors 748 that are part of another wireless device. For example, the wireless device 702 may receive motion information 744a-b from one or more motion sensors 748 that are part of another device 732 (e.g., a wearable device, such as a fitness tracker) that communicates with the wireless device 702 via Bluetooth®. Motion information 744a-b may directly indicate whether the wireless device 702 has moved, such that it may not be necessary to compare the motion information 744a received at time $t_1$ with the motion information 744b received at time $t_2$.

The environment information 710 may also include information that is obtained from one or more other components of the wireless device 702. For example, the environment information 710 may include images 752a-b received from a camera 754 of the wireless device 702. As another example, the environment information 710 may include audio information 756a-b received from a microphone 758 of the wireless device 702. Comparing images 752a-b and/or audio information 756a-b captured at different times may provide information that may be used to determine whether the wireless device 702 has moved. Location information received from the GPS radio 704e may be another source of environment information 710, because it may indicate whether (and to what extent) the wireless device 702 has moved.

In some implementations, the various types of environment information 710 may be weighted, such that some information may be considered to be more important than other information. Environment information 710 that is considered to be more reliable may be assigned a higher weight than environment information 710 that is considered to be less reliable. The relative weights of the various types of environment information 710 may be used to resolve conflicting information. For example, suppose that the motion information 744a-b is assigned a higher weight than the identifiers 742a-b, because there may be other reasons (besides movement of the wireless device 702) why a set of identifiers may change over time. In this case, if the identifiers 742a-b that are received indicate that the wireless device 702 has moved but the motion information 744a-b indicates that the wireless device 702 has not moved, the adaptive backoff module 708 may give more weight to the motion information 744a-b and may therefore conclude that the wireless device likely has not moved.

Figure 8:
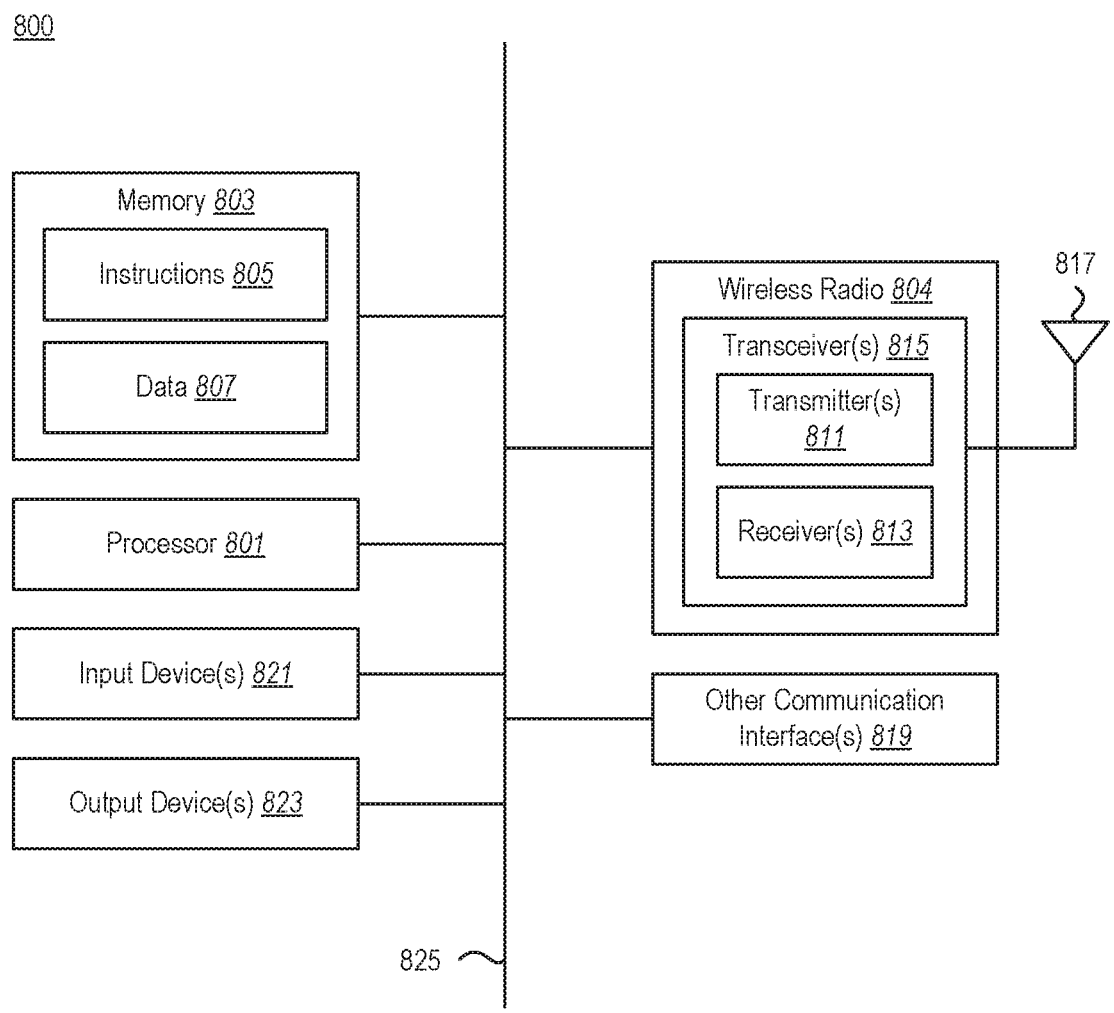
FIG. 8 illustrates certain components that may be included within a wireless communication device.

FIG. 8 illustrates certain components that may be included within a wireless communication device 800. Any of the wireless devices 102, 302, 502, 702, access points 112, 312a-n, 512a-b, 712a-b or other wireless communication devices (e.g., other wireless devices 116, Bluetooth® device(s) 732, NFC terminal(s) 736, GPS satellite(s) 740) described previously may include some or all of the components in the wireless communication device 800 shown in FIG. 8.

The wireless communication device 800 includes a processor 801. The processor 801 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the wireless communication device 800 of FIG. 8, in an alternative configuration, a combination of processors (e.g., an ARM and DSP) could be used.

The wireless communication device 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein, including the methods 200, 400, 600 shown in FIGS. 2, 4, and 6. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

The wireless communication device 800 may include one or more wireless radios 804. Each wireless radio 804 may include at least one transceiver 815, and each transceiver 815 may include at least one transmitter 811 and at least one receiver 813. Each transceiver 815 may allow transmission and reception of signals between the wireless communication device 800 and other devices. One or more antennas 817 may be electrically coupled to the transceiver(s) 815.

The wireless communication device 800 may also include one or more other communication interfaces 819, which may be based on wired communication technology. Some examples of other communication interfaces 819 that may be included in the wireless communication device 800 include a Universal Serial Bus (USB) and an Ethernet adapter.

A wireless communication device 800 may also include one or more input devices 821 and one or more output devices 823. Some examples of input devices 821 include a keyboard, mouse, microphone, remote control device, button, joystick, trackball, touchpad, and lightpen. Some examples of output devices 823 include a display device, a speaker, and a printer.

The various components of the wireless communication device 800 may be coupled together by one or more buses, which may include a power bus, a control signal bus, a status signal bus, a data bus, etc. For the sake of clarity, the various buses are illustrated in FIG. 8 as a bus system 825.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A wireless device, comprising:
   a wireless radio;
   a processor;
   memory in electronic communication with the processor; and
   instructions stored in the memory, the instructions being executable by the processor to:
      cause the wireless radio to perform a plurality of scans to search for an available wireless network;
      maintain a monitored pool of information about potential connections for the wireless device;
      determine a first set of entries in the monitored pool of information at a first time;
      determine a second set entries in the monitored pool of information at a second time;
      perform a comparison of the first set of entries in the monitored pool of information at the first time and the second set of entries in the monitored pool of information at the second time; and
      adjust a time period between successive scans based on the comparison.

2. The wireless device of claim 1, wherein:
   the monitored pool of information at the first time and the monitored pool of information at the second time both comprise at least one signal strength measurement for at least one frequency;
   adjusting the time period between the successive scans comprises decreasing the time period between the successive scans if the comparison indicates that a signal strength measurement associated with a frequency has increased by a threshold value; and
   adjusting the time period between the successive scans comprises increasing the time period between the successive scans if the comparison indicates that the signal strength measurement associated with the frequency has decreased by the threshold value.

3. The wireless device of claim 1, wherein:
   the monitored pool of information comprises a monitored pool of frequencies;
   the first set of entries comprises the monitored pool of frequencies updated at the first time; and
   the second set of entries comprises the monitored pool of frequencies updated at the second time.

4. The wireless device of claim 1, wherein determining the second set of entries in the monitored pool of information comprises:
   adding first information about a first potential connection for the wireless device to the monitored pool of information if the comparison indicates that a first signal strength measurement associated with the first potential connection has increased above a threshold value by more than a buffer since the first time; and
   removing second information about a second potential connection for the wireless device from the monitored pool of information if the comparison indicates that a second signal strength measurement associated with the second potential connection has decreased below the threshold value by more than the buffer since the first time.

5. The wireless device of claim 1, wherein:
   the wireless device is connected to a roaming network when the plurality of scans are performed; and
   the plurality of scans are performed to search for a home network.

6. The wireless device of claim 5, wherein:
   the monitored pool of information at the first time and the monitored pool of information at the second time both comprise at least one signal strength measurement for at least one network;
   adjusting the time period between the successive scans comprises decreasing the time period between the successive scans if the comparison indicates that a signal strength measurement associated with a network has increased by a threshold value; and
   adjusting the time period between the successive scans comprises increasing the time period between the successive scans if the comparison indicates that the signal strength measurement associated with the network has decreased by the threshold value.

7. The wireless device of claim 1, wherein:
   the monitored pool of information comprises a monitored pool of networks;
   the first set of entries comprises the monitored pool of networks updated at the first time; and
   the second set of entries comprises the monitored pool of networks updated at the second time.

8. The wireless device of claim 7, wherein the instructions are also executable by the processor to:
   add a network to the monitored pool of networks if the comparison indicates that a signal strength measurement associated with the network has increased above a threshold value; and
   remove the network from the monitored pool of networks if the comparison indicates that the signal strength measurement associated with the network has decreased below the threshold value by more than a buffer.

9. The wireless device of claim 1, wherein the first set of entries and the second set of entries comprise at least one of:
   signal strength measurements for wireless signals corresponding to a plurality of different frequencies;
   identifiers received from other wireless devices;
   motion information provided by a motion sensor;
   images provided by a camera; or
   audio information provided by a microphone.

10. A method for adaptive backoff, the method being implemented by a wireless device, the method comprising:
    performing a plurality of scans to search for an available wireless network;
    maintaining a monitored pool of information about potential connections for the wireless device;
    determining a first set of entries in the monitored pool of information at a first time;
    determining a second set of entries in the monitored pool of information at a second time;
    performing a comparison of the first set of entries in the monitored pool of information at the first time and the second set of entries in the monitored pool of information at the second time; and
    adjusting a time period between successive scans based on the comparison.

11. The method of claim 10, wherein:
    the monitored pool of information at the first time and the monitored pool of information at the second time both comprise at least one signal strength measurement for at least one frequency;
    adjusting the time period between the successive scans comprises decreasing the time period between the successive scans if the comparison indicates that a signal strength measurement associated with a frequency has increased by a threshold value; and adjusting the time period between the successive scans comprises increasing the time period between the successive scans if the comparison indicates that the signal strength measurement associated with the frequency has decreased by the threshold value.

12. The method of claim 10, wherein:
the monitored pool of information comprise a monitored pool of frequencies;
the first set of entries comprises the monitored pool of frequencies updated at the first time; and
the second set of entries comprises the monitored pool of frequencies updated at the second time.

13. The method of claim 10, wherein determining the second set of entries in the monitored pool of information comprises:
adding first information about a first potential connection for the wireless device to the monitored pool of information if the comparison indicates that a first signal strength measurement associated with the first potential connection has increased above a threshold value by more than a buffer since the first time; and
removing second information about a second potential connection for the wireless device from the monitored pool of information if the comparison indicates that a second signal strength measurement associated with the second potential connection has decreased below the threshold value by more than the buffer since the first time.

14. The method of claim 10, wherein:
the wireless device is connected to a roaming network when the plurality of scans are performed; and
the plurality of scans are performed to search for a home network.

15. The method of claim 14, wherein:
the monitored pool of information at the first time and the monitored pool of information at the second time both comprise at least one signal strength measurement for at least one network;
adjusting the time period between the successive scans comprises decreasing the time period between the successive scans if the comparison indicates that a signal strength measurement associated with a network has increased by a threshold value; and
adjusting the time period between the successive scans comprises increasing the time period between the successive scans if the comparison indicates that the signal strength measurement associated with the network has decreased by the threshold value.

16. The method of claim 10, wherein:
the monitored pool of information comprise a monitored pool of networks;
the first set of entries comprises the monitored pool of networks updated at the first time; and
the second set of entries comprises the monitored pool of networks updated at the second time.

17. The method of claim 16, further comprising:
adding a network to the monitored pool of networks if the comparison indicates that a signal strength measurement associated with the network has increased above a threshold value; and
removing the network from the monitored pool of networks if the comparison indicates that the signal strength measurement associated with the network has decreased below the threshold value by more than a buffer.

18. The method of claim 10, wherein the first set of entries and the second set of entries comprise at least one of:
signal strength measurements for wireless signals corresponding to a plurality of different frequencies;
identifiers received from other wireless devices;
motion information provided by a motion sensor;
images provided by a camera; or
audio information provided by a microphone.

19. A wireless device, comprising:
a wireless radio;
a processor;
memory in electronic communication with the processor; and
instructions stored in the memory, the instructions being executable by the processor to:
cause the wireless radio to perform a plurality of scans to search for an available wireless network to which the wireless device is not already connected;
maintain a monitored pool of information about potential connections for the wireless device;
determine a first set of entries in the monitored pool of information at a first time;
determine a second set of entries in the monitored pool of information at a second time;
perform a comparison of the first set of entries in the monitored pool of information at the first time and the second set of entries in the monitored pool of information at the second time;
make an inference, based on the comparison, about whether the wireless device has moved during a time interval between the first time and the second time; and
adjust a time period between successive scans based on the inference.

20. The wireless device of claim 19, wherein:
adjusting the time period between the successive scans comprises decreasing the time period between the successive scans if the inference is that the wireless device has moved during the time interval; and
adjusting the time period between the successive scans comprises increasing the time period between the successive scans if the inference is that the wireless device has not moved during the time interval.

* * * * *